United States Patent [19]

Clegg

[11] Patent Number: 4,601,549

[45] Date of Patent: Jul. 22, 1986

[54] ULTRAVIOLET BEAM CONCENTRATOR

[76] Inventor: John E. Clegg, 2320 Keystone Dr., Orlando, Fla. 32806

[21] Appl. No.: 671,716

[22] Filed: Nov. 15, 1984

[51] Int. Cl.⁴ .................. G02B 13/18; G02B 17/08
[52] U.S. Cl. .................................. 350/432; 350/1.1; 350/443
[58] Field of Search .................. 350/1.1, 432, 443

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |
| 4,572,621 | 2/1986 | Clegg | 350/432 |

Primary Examiner—John K. Corbin
Assistant Examiner—Scott J. Sugarman

[57] ABSTRACT

A concave conical-planar lens which receives and refracts three annular convergent conical incipient beams of diffused sunlight, producing three annular spectral beams; a circular shield with three annular slits which emit the ultraviolet portions of the beams through the planar section of the lens; three annular 45° mirrors which reflect the ultraviolet beams in toward the vertical axis of the concentrator, forming three lateral ultraviolet beams in the horizontal planes; a conical 45° mirror which reflects the lateral ultraviolet beams downward, forming a whole ultraviolet beam; and a conical beam concentrator which refracts the whole ultraviolet beam, forming a concentrated whole ultraviolet beam which is emitted in the vertical axis of the concentrator.

1 Claim, 2 Drawing Figures

ULTRAVIOLET BEAM CONCENTRATOR

BACKGROUND

The ultraviolet beam concentrator has a code designation of 2RT-LTLT-TR:CUV (R-refracting section of a component lens, T-transmitting section of a component lens, L-reflecting section of a component mirror, C-concentrating stage lens, and UV-ultraviolet).

Prior art is limited to conical beam concentrators which produce concentrated whole nonspectral beams. The lower concentrator is a modification of the *Conical Beam Concentrator*, U.S. Pat. No. 4,333,713, 6/8/82, by this inventor. The code designation of this concentrator is M:RR-RT:C, whereas the code designation of the lower concentrator disclosed herein is M:2RT:C.

DRAWINGS

DESCRIPTION

Figure 1:
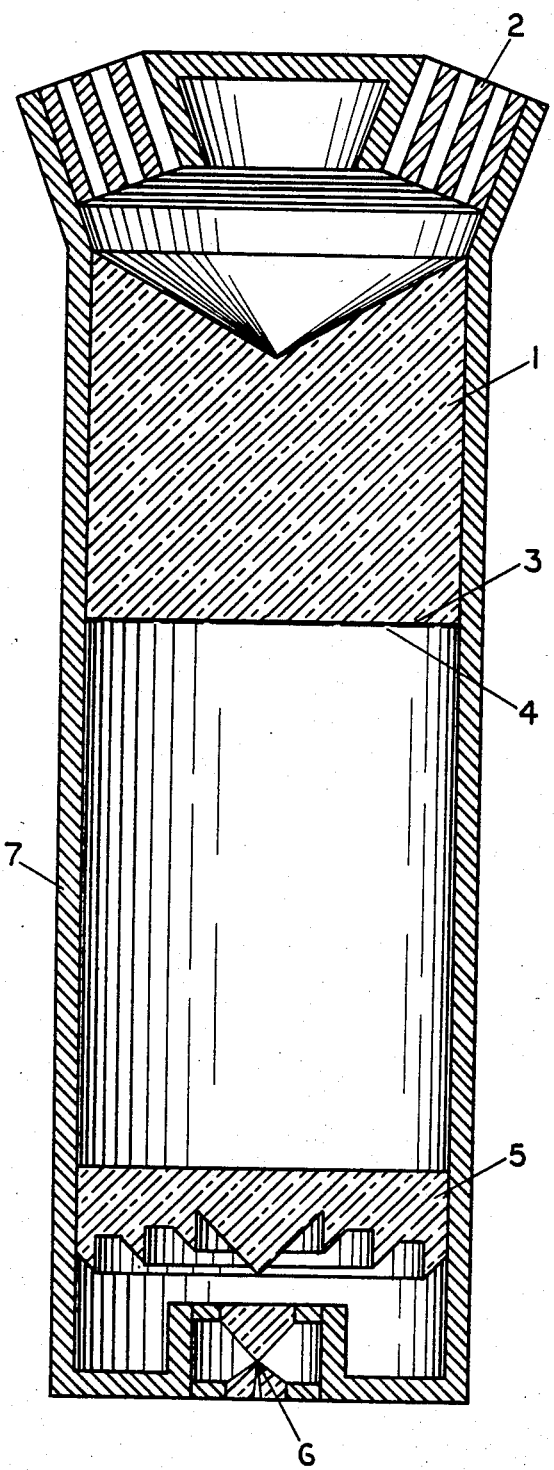
FIG. 1 is an elevation of the ultraviolet beam concentrator with the lenses and mirror shown in section.

FIG. 1 shows the ultraviolet beam concentrator comprising upper component lens TR 1 with three annular conical louvers 2 and circular shield 3 with three annular slits 4, middle component mirror 5 and lower conical beam concentrator M-2RT:C 6 mounted inside casing 7.

Figure 2:
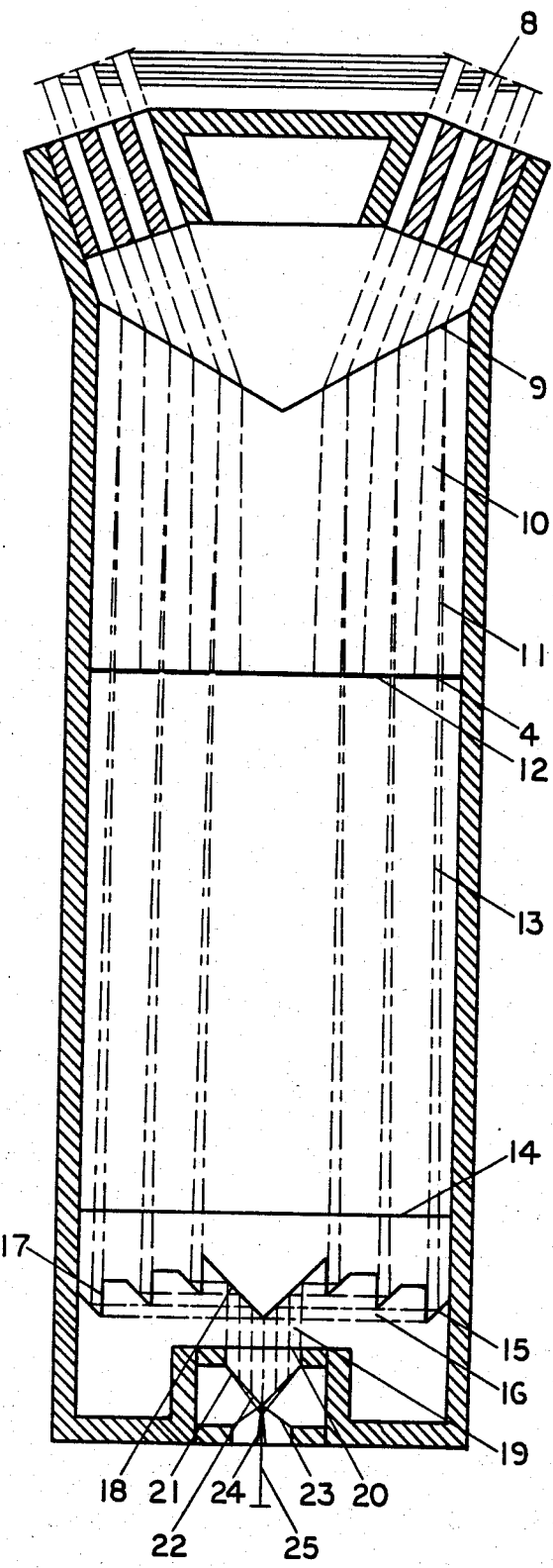
FIG. 2 is an elevation of the concentrator with a ray diagram.

FIG. 2 shows the concentrator with a ray diagram. Three annular convergent conical incipient beams 8 of diffused sunlight are received and refracted by concave conical section 9, forming spectral beams 10. The ultraviolet portions 11 of beams 10 are emitted from planar section 12 through annular slits 4, forming three annular ultraviolet beams 13.

Beams 13 are transmitted through planar section 14 and reflected in toward the vertical axis of the concentrator by three annular rear-surface 45° mirrors 15, forming three convergent lateral ultraviolet beams 16 in the horizontal planes.

Beams 16 are transmitted by three cylindrical sections 17 and reflected downward by convex conical front-surface 45° mirror 18, forming whole ultraviolet beam 19.

Beam 19 is transmitted by planar section 20 and refracted by convex conical section 21, forming convergent conical ultraviolet beam 22.

Beam 22 is transmitted by convex conical section 23 and refracted by concave conical section 24, forming concentrated whole ultraviolet beam 25 which is emitted in the vertical axis of the concentrator.

I claim:

1. An ultraviolet beam concentrator 2RT-LTLT-TR:CUV comprising;
   a. An upper component lens TR (1) with a concave conical section (9) and a planar section (12),
   b. Three annular conical louvers (2) mounted above upper component lens TR (1),
   c. A circular shield (3) having three annular slits (4) mounted below upper component lens TR (1),
   d. A middle component mirror (5) having a planar section (14), three annular rear-surface 45° mirrors (15), three cylindrical sections (17) and a convex conical front-surface 45° mirror (18), and
   e. A lower beam concentrator M:2RT:C (6) mounted below middle component mirror (5) and having a planar section (20), a convex conical section (21), convex conical section (23) and a concave conical section (24).

* * * * *